United States Patent
Li et al.

(10) Patent No.: US 11,634,333 B2
(45) Date of Patent: Apr. 25, 2023

(54) BORON-CONTAINING TITANIUM-BASED COMPOSITE POWDER FOR 3D PRINTING AND METHOD OF PREPARING SAME

(71) Applicant: Xi'an University of Technology, Shaanxi (CN)

(72) Inventors: Shufeng Li, Shaanxi (CN); Deng Pan, Shaanxi (CN); Xin Zhang, Shaanxi (CN); Lei Liu, Shaanxi (CN); Dongxu Hui, Shaanxi (CN)

(73) Assignee: Xi'an University of Technology, Xi'an (CN)

( * ) Notice: Subject to any disclaimer, the term of this patent is extended or adjusted under 35 U.S.C. 154(b) by 445 days.

(21) Appl. No.: 16/883,657

(22) Filed: May 26, 2020

(65) Prior Publication Data

US 2020/0399135 A1  Dec. 24, 2020

(30) Foreign Application Priority Data

Jun. 18, 2019 (CN) .......................... 201910528485.4

(51) Int. Cl.
  *C01B 35/04* (2006.01)
  *B33Y 70/00* (2020.01)

(52) U.S. Cl.
  CPC .............. *C01B 35/04* (2013.01); *B33Y 70/00* (2014.12); *C01P 2002/90* (2013.01); *C01P 2004/61* (2013.01)

(58) Field of Classification Search
  None
  See application file for complete search history.

(56) References Cited

U.S. PATENT DOCUMENTS 3,802,850 A   4/1974 Clougherty

FOREIGN PATENT DOCUMENTS

| CN | 101333607 A | 12/2008 |
| CN | 104195361 A | 12/2014 |
| CN | 104263984 A | 1/2015 |
| CN | 104928513 A | 9/2015 |
| CN | 106906379 A | 6/2017 |
| CN | 107400802 A | 11/2017 |
| CN | 107841654 A | 3/2018 |

(Continued)

OTHER PUBLICATIONS

Boehlert, C. J. (2009). The creep behavior of powder-metallurgy processed Ti—6Al—4V—1 B(wt.%). Materials Science and Engineering: A, 510-511, 434-439.

*Primary Examiner* — Ronak C Patel

(57) ABSTRACT

This invention discloses a boron-containing titanium-based composite powder for 3D printing, consisting of 0.5%-2% by weight of titanium diboride and 98%-99.5% by weight of titanium sponge. The invention further discloses a method of preparing such composite powder, where the element boron is introduced to the titanium powder through rapid solidification, which significantly improves the solid solubility of boron in Ti, enabling the introduction of part of the boron into the titanium matrix to form supersaturated solid solutions. The reinforcement phase TiB in the boron-containing titanium-based composite powder prepared herein can be precisely controlled in grain size ranging from the nanometer scale to the micrometer scale through temperature or energy density, thereby preparing the titanium-based composite materials with different sizes of reinforcement phases to meet different mechanical requirements.

6 Claims, 6 Drawing Sheets

(56) References Cited

FOREIGN PATENT DOCUMENTS

| | | | |
|---|---|---|---|
| CN | 108531777 | A | 9/2018 |
| CN | 108555281 | A | 9/2018 |
| CN | 108620586 | A | 10/2018 |
| CN | 108796264 | A | 11/2018 |
| CN | 109735743 | A | 5/2019 |

BORON-CONTAINING TITANIUM-BASED COMPOSITE POWDER FOR 3D PRINTING AND METHOD OF PREPARING SAME

CROSS-REFERENCE TO RELATED APPLICATIONS

This application claims the benefit of priority from Chinese Patent Application No. 201910528485.4, filed on Jun. 18, 2019. The content of the aforementioned application, including any intervening amendments thereto, is incorporated herein by reference in its entirety.

TECHNICAL FIELD

The present application relates to the preparation of metal composite powder and 3D printing technique, and more particularly to a boron-containing titanium-based composite powder for 3D printing and a method of preparing the same.

BACKGROUND OF THE INVENTION

Titanium and titanium alloys are widely applied in aerospace, marine and medical fields, due to their low density, high specific strength, good corrosion resistance, excellent creep resistance at high temperature and good biocompatibility. However, due to the difficulties in the extraction, smelting and processing of titanium, the titanium ingot has high production cost, which is about 30 times of the steel ingot with the same weight. Moreover, it will cost much more for the manufacturing of aerospace components and parts from titanium. Therefore, reducing the production cost of titanium and titanium alloys plays a critical role for expanding the application and consumption of titanium.

Currently, titanium-based composite materials are prepared mainly by powder metallurgy and melting casting, in which titanium is mechanically mixed with an additional reinforcement phase, and then treated by powder metallurgy or melting casting. The titanium-based composite materials prepared by conventional methods are generally required to be treated by a complicated thermal process including extrusion, forging and rolling to eliminate internal defects before use. Moreover, despite the high strength, these titanium-based composite materials prepared by conventional methods are unsatisfactory in plasticity/toughness, and impacts of the original particle size and temperature render the reinforcement phase therein hard to be regulated in size, which leads to the uncontrollability in performance of the composite materials, lowering the reliability and greatly limiting their application.

In recent years, spherical titanium powder, due to its high sphericity, good fluidity, high bulk density and low oxygen content, is widely applied in the fields of powder metallurgy, 3D printing, thermal spraying, etc., especially in the 3D printing. Compared to conventional techniques, the 3D printing has a significant advantage in manufacturing the products which involve complex shape and complicated mechanical processing, which not only can greatly shorten the manufacturing cycle and optimize the utilization rate to 90% or more, but also has no involvement of large-scale equipment, reducing the production cost. Currently, the 3D printing technique can be used to manufacture high-performance components, such as titanium alloy blades and blisks, from the spherical titanium powder via one-step forming, and these components are comparable to forged products in the mechanical properties.

In current researches on the preparation of titanium-based composite materials by 3D printing, the raw materials are still mixed in a mechanical manner, that is, the spherical titanium powder and the reinforcement phase such as $TiB_2$ are mechanically mixed by ball milling to obtain the powder mixture for 3D printing. However, there are some defects in the powder mixture prepared by mechanical mixing, for example, the ball milling is prone to the occurrence of powder sphericity damage, uneven mixing and introduction of impurities, readily resulting in the occurrence of impurities, pores and stress concentration in the finished products. Moreover, in the titanium-based powder mixture prepared by conventional methods, it is difficult to regulate the size of the reinforcement phase due to the effects of its original particle size and the solidification rate, which further renders the performance of the titanium-based composite material uncontrollable, limiting the application range of the titanium-based composite materials.

Given the above problems, this invention provides a supersaturated solid solution-nucleation-precipitation-growth mechanism of the reinforcement phase to replace the in-situ reaction-diffusion-growth mechanism in the conventional methods, and also provides a combination technique of melting and casting, in situ formation, rapid solidification and 3D printing/powder metallurgy, where the use of the rapid solidification during gas atomization to prepare the boron-containing titanium-based composite powder lays a foundation for the preparation of high-performance TiBw/Ti composite materials by 3D printing.

SUMMARY OF THE INVENTION

The invention aims to provide a boron-containing titanium-based composite powder for 3D printing to overcome the defects in the prior art that the reinforcement phase in the titanium-based composite material is uncontrollable in size.

The invention further provides a method of preparing the boron-containing titanium-based composite powder for 3D printing.

The technical solutions of this invention are described as follows.

In a first aspect, the invention provides a boron-containing titanium-based composite powder for 3D printing, consisting of 0.5%-2% by weight of titanium diboride and 98%-99.5% by weight of titanium sponge;

wherein the boron-containing titanium-based composite powder has an internal nano quasi-continuous network structure formed by TiBw and Ti crystal grains; the quasi-continuous network structure has a size of 2-3 μm and TiBw has a particle size of 8-15 nm.

In a second aspect, the invention provides a method of preparing the boron-containing titanium-based composite powder for 3D printing, including:

(1) mixing 0.5%-2% by weight of the titanium diboride with 98%-99.5% by weight of the titanium sponge to produce a powder mixture;

(2) pressing the powder mixture into a consumable electrode with a size of 300×60×60 mm by a hydraulic press;

(3) performing vacuum melting twice on the consumable electrode to obtain a composite ingot with a diameter of 170 mm;

(4) polishing the composite ingot; heating the polished ingot to a first temperature in a high-temperature furnace; keeping the polished ingot at the first temperature; subjecting the heated composite ingot to billet forging using a 1-ton air hammer to obtain a bar A; polishing the bar A and heating the polished bar A to a second temperature in the high-temperature furnace; keeping the polished bar A at the second temperature; forging the heated bar A using a radial forging machine to obtain a bar B; mechanically processing the bar B to produce a composite titanium-based bar C with a size of 41 mm×400 mm; and (5) subjecting the composite titanium-based bar C to electrode induction melting ultrasonic gas atomization to prepare the boron-containing titanium-based composite powder.

The beneficial effects of the present invention are described as follows.

(1) Compared to the conventional titanium powder, the boron-containing titanium-based composite powder further contains boron element, which is introduced into the titanium matrix through rapid solidification. The rapid solidification can not only significantly improve the solid solubility of boron in Ti, enabling the introduction of part of the boron into the titanium matrix to form supersaturated solid solutions, but also allow part of the precipitated nano TiBw to uniformly distribute in the composite powder.

(2) The boron-containing titanium-based composite powder provided herein has an internal quasi-continuous network structure formed by TiBw and Ti crystal grains, where the network structure has a size of 2-3 μm and TiBw has a particle size of 8-15 nm.

(3) During the preparation of the TiB/Ti composite materials using the boron-containing titanium-based composite powder as raw materials, the reinforcement phase TiBw can be accurately controlled by temperature or energy density in grain size ranging from the nanometer scale to the micrometer scale.

(4) Compared to the existing titanium powder for 3D printing, the boron-containing titanium-based composite powder prepared herein can be directly used for 3D printing or for powder metallurgy to produce TiBw/Ti composite materials without undergoing the mechanical mixing of the spherical titanium powder and the reinforcement phase, avoiding the damage to powder sphericity and the introduction of impurities during the mechanical mixing.

DETAILED DESCRIPTION OF EMBODIMENTS

Figure 1:
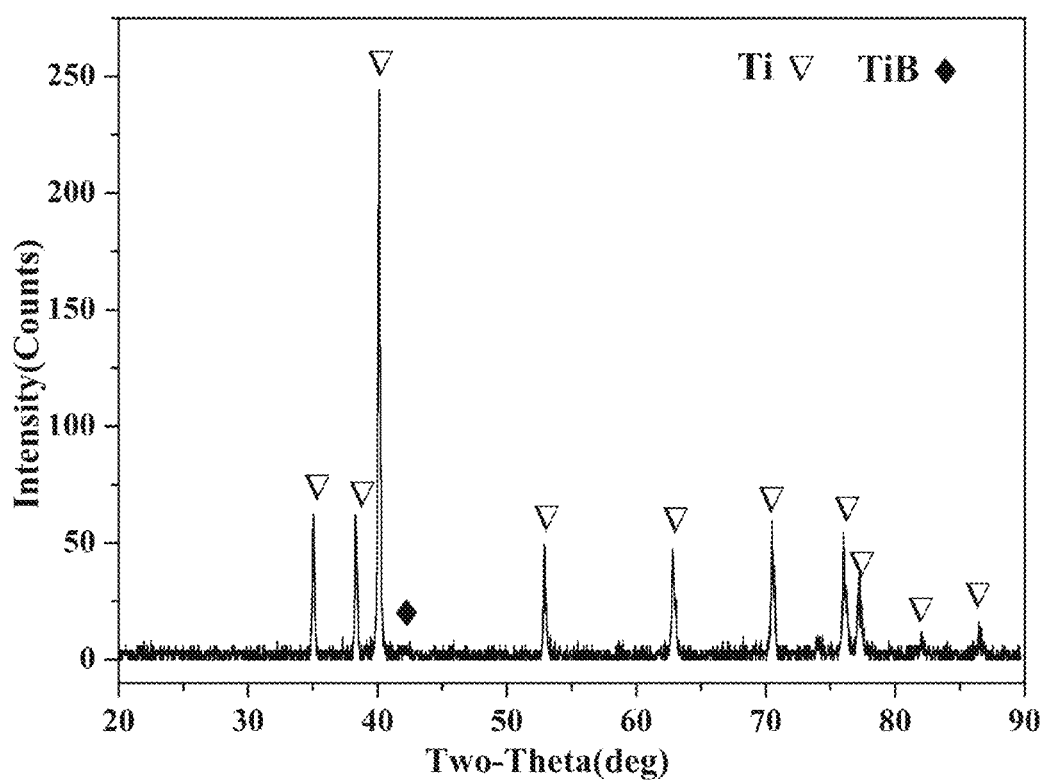
FIG. 1 is an XRD pattern of a boron-containing titanium-based composite powder prepared in the invention.

This invention will be described in detail below with reference to the accompanying drawings and embodiments.

The invention provides a TiBw/Ti composite powder for 3D printing consisting of 0.5%-2% by weight of titanium diboride and 98%-99.5% by weight of titanium sponge, where the composition of respective raw materials is specifically shown in Table 1.

TABLE 1

| Compositions of the titanium diboride and the titanium sponge | | | | | | | | | |
|---|---|---|---|---|---|---|---|---|---|
| Titanium sponge | Element | Ti | Fe | Si | Cl | C | N | O | H |
| | Content (wt. %) | ≥99.8 | 0.01 | <0.01 | 0.06 | 0.008 | 0.003 | 0.046 | 0.0007 |
| TiBw$_2$ | Element | Ti | B | Fe | Si | C | / | / | / |
| | Content (wt. %) | 66.97 | 32.6 | 0.065 | 0.01 | 0.36 | / | / | / |

The invention also provides a method of preparing the TiB/Ti composite powder for 3D printing, including:

(1) 0.5%-2% by weight of the titanium diboride and 98%-99.5% by weight of the titanium sponge were respectively prepared and uniformly mixed to obtain a powder mixture.

(2) The powder mixture was pressed into a consumable electrode with a size of 300×60×60 mm by a 630-ton hydraulic press.

(3) Vacuum melting was performed twice on the consumable electrode to obtain a composite ingot with a diameter of 170 mm, where the element B was derived from the titanium diboride, and the element Ti was derived from the titanium sponge.

(4) The composite ingot was polished and heated to 1000-1050° C. in a high-temperature furnace, and kept at 1000-1050° C. for 2 h. The heated composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine to obtain a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

During the powder preparation by gas atomization, the rapid solidification involved can significantly improve the solid solubility of boron atoms (derived from TiB$_2$) in Ti, allowing part of the boron atoms to be introduced into the titanium matrix to form supersaturated solid solutions, and other boron atoms to form nano TiBw to uniformly distribute in the titanium matrix.

The boron-containing titanium-based composite powder prepared above is subjected to heat treatment.

Specifically, the boron-containing titanium-based composite powder obtained in step (5) is subjected to heat treatment at 750-1000° C. using a Sparking Plasma Sintering (SPS) device, and then kept at 750-1000° C. for 15 min to obtain the TiB/Ti composite powder with different sizes of the reinforcement phase.

The boron-containing titanium-based composite powder prepared herein can be directly used for 3D printing to produce TiBw/Ti composite materials without undergoing the conventional mechanical mixing in the preparation of the powder mixture for 3D printing, avoiding the damage to spherical powder sphericity and the introduction of impurities. The reinforcement phase TiBw in the TiBw/Ti composite materials is controllable in size. The rapid solidification involved in gas atomization can significantly improve the solid solubility of boron atoms (derived from $TiB_2$) in Ti, allowing part of the boron atoms to be introduced into the titanium matrix to form supersaturated solid solutions. The boron-containing titanium-based composite powder is subjected to heat treatment at different temperature to allow the occurrence of in situ reaction between boron and titanium to produce the reinforcement phase TiBw, where the reinforcement phase TiBw can be precisely controlled in grain size ranging from the nanometer scale to the micrometer scale through temperature or energy density, thereby preparing the TiBw/Ti composite materials with different grain sizes of TiBw by 3D printing to meet different mechanical requirements.

FIG. 1 is an XRD pattern showing the phase analysis of the boron-containing titanium-based composite powder. It can be seen that the composite powder is predominated by Ti and TiBw, where the TiBw diffraction peak is not obvious, which is mainly caused by the small molecular weight and low content of element B.

Figure 2:
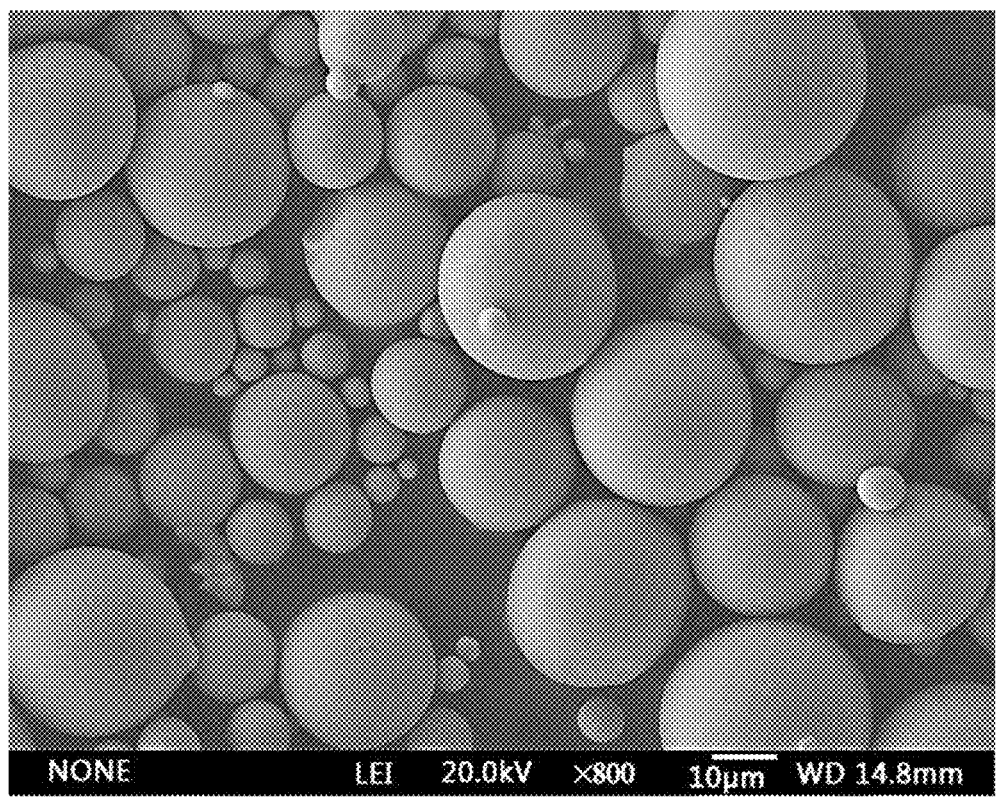
FIG. 2 is a scanning electron micrograph showing the boron-containing titanium-based composite powder of the invention.

FIG. 2 shows the surface morphology of the boron-containing titanium-based composite powder prepared in the invention. It can be seen that the composite powder has good sphericity and smooth surface, and no satellite powder is observed.

Figure 3:
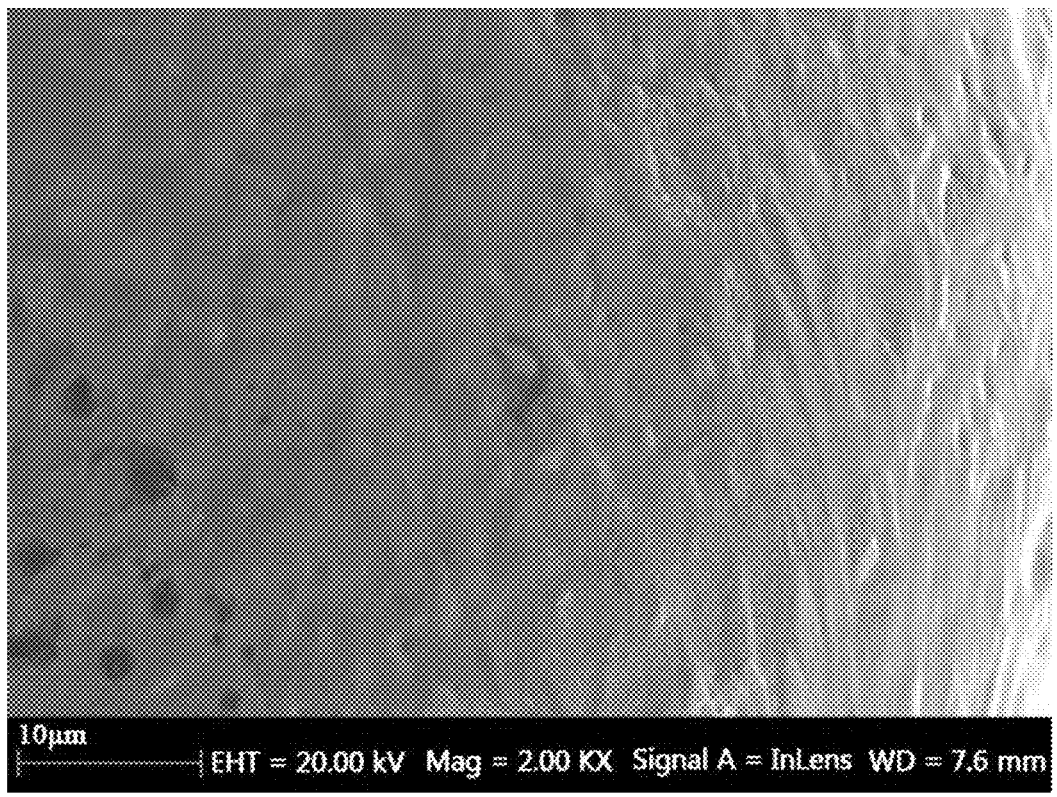
FIG. 3 is a scanning electron micrograph showing enlarged spherical surfaces of the boron-containing titanium-based composite powder of the invention.

FIG. 3 is an enlarged view of surfaces of the spherical powder. It can be seen that there are no cracks and holes on the surfaces.

Figure 4:
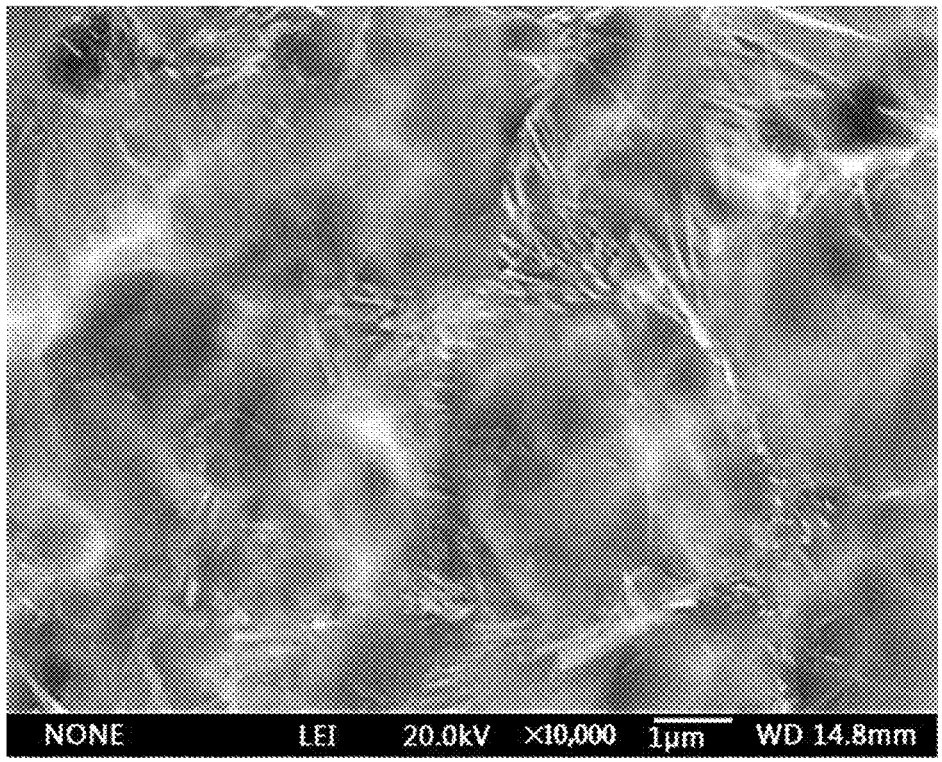
FIG. 4 is a scanning electron micrograph showing the cross-section micromorphology of the boron-containing titanium-based composite powder of the invention.

FIG. 4 shows the cross-section micromorphology of the composite powder. It can be seen that in the composite powder, small TiBw crystal whiskers are formed and distributed at grain boundaries.

Figure 5:
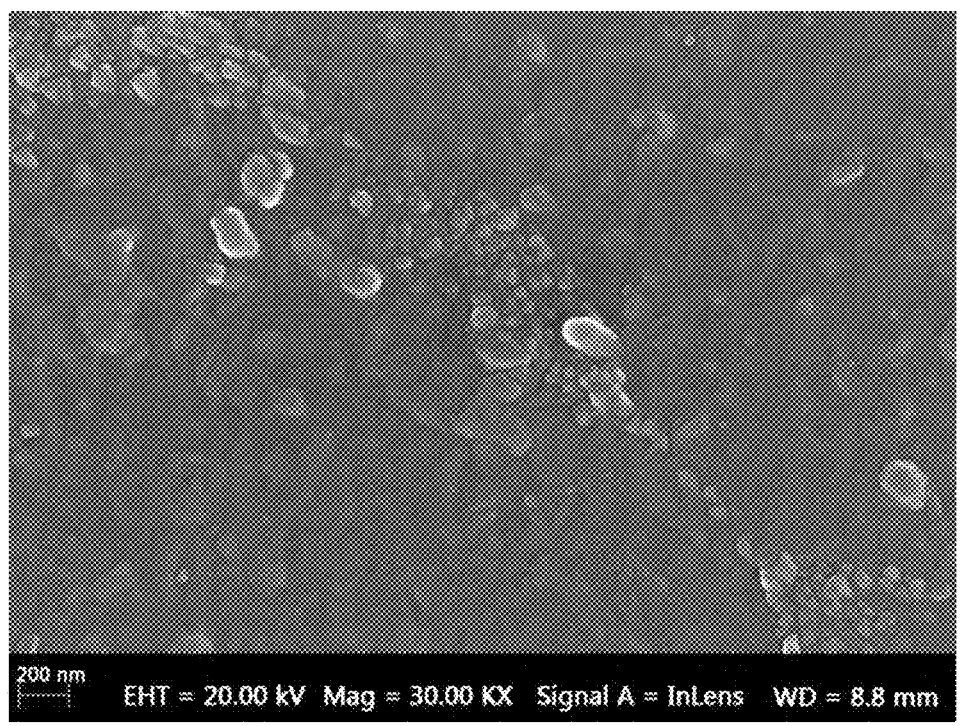
FIG. 5 is a scanning electron micrograph showing the morphology of the boron-containing titanium-based composite powder after heat-treated at 750° C.

FIG. 5 shows the morphology of the boron-containing titanium-based composite powder after heat-treated at 750° C., where TiBw is mainly distributed at the grain boundaries, and is relatively tiny with a particle size of 100 nm or less.

Figure 6:
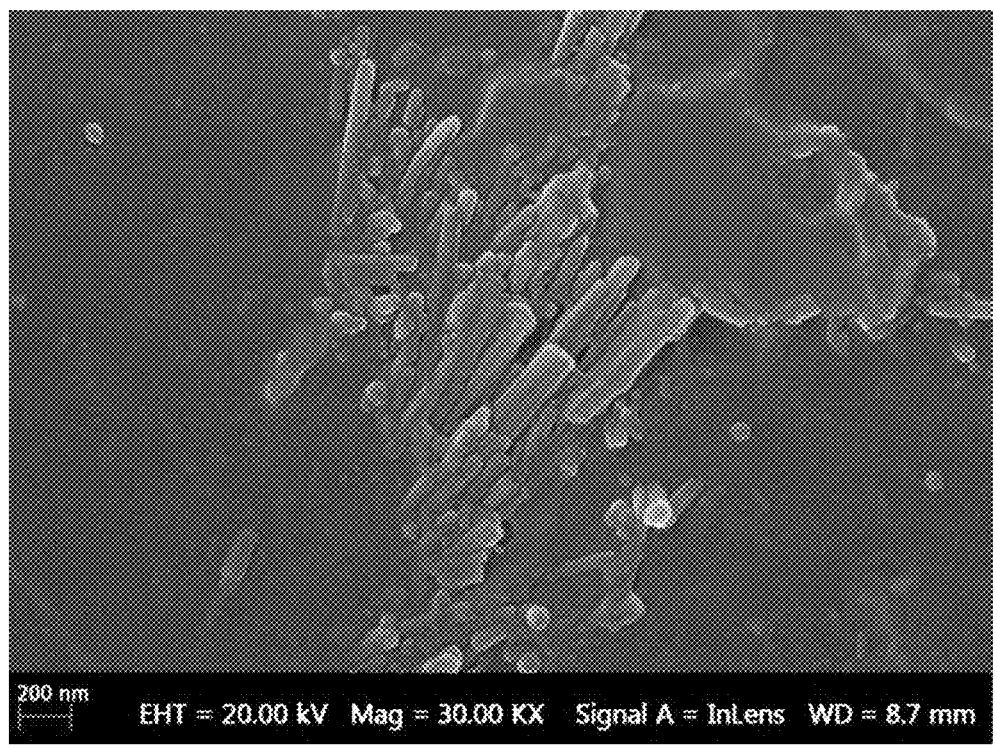
FIG. 6 is a scanning electron micrograph showing the morphology of the boron-containing titanium-based composite powder after heat-treated at 850° C.

FIG. 6 shows the morphology of the boron-containing titanium-based composite powder after heat-treated at 850° C., where the TiBw crystal whiskers grow with the increase of the temperature, and have particle sizes of 200-300 nm at 850° C.

Figure 7:
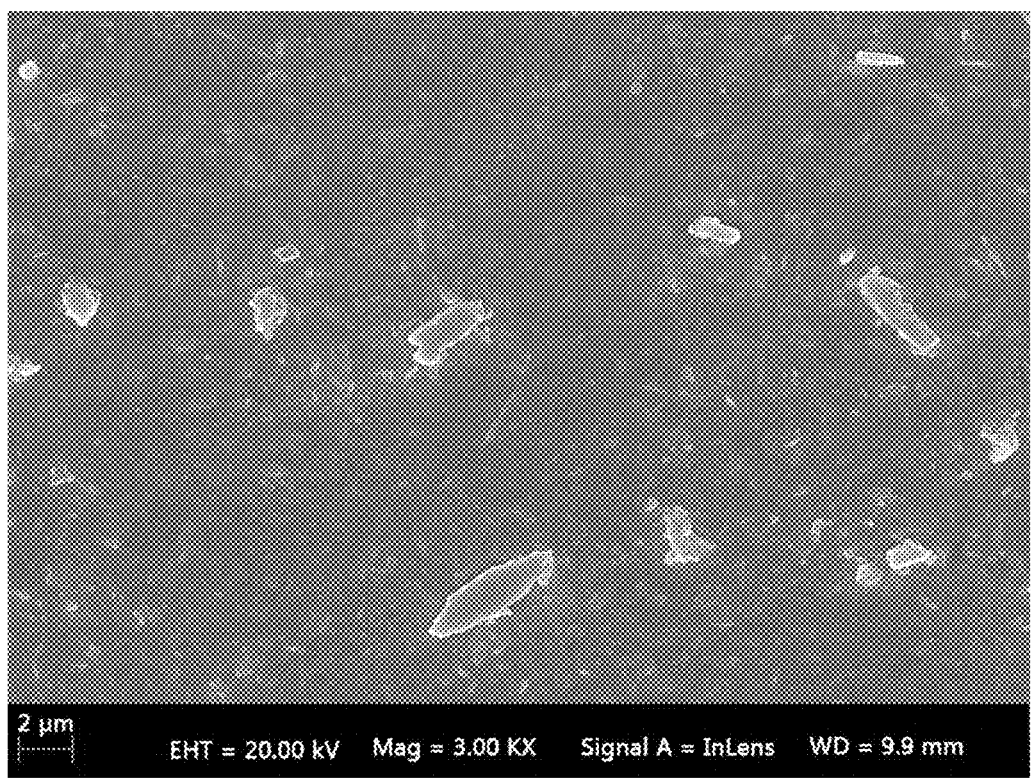
FIG. 7 is a scanning electron micrograph showing the morphology of the boron-containing titanium-based composite powder after heat-treated at 950° C.

FIG. 7 shows the morphology of the boron-containing titanium-based composite powder after heat-treated at 950° C., where the TiBw crystal whiskers grow to a particle size of 2-3 μm.

Figure 8:
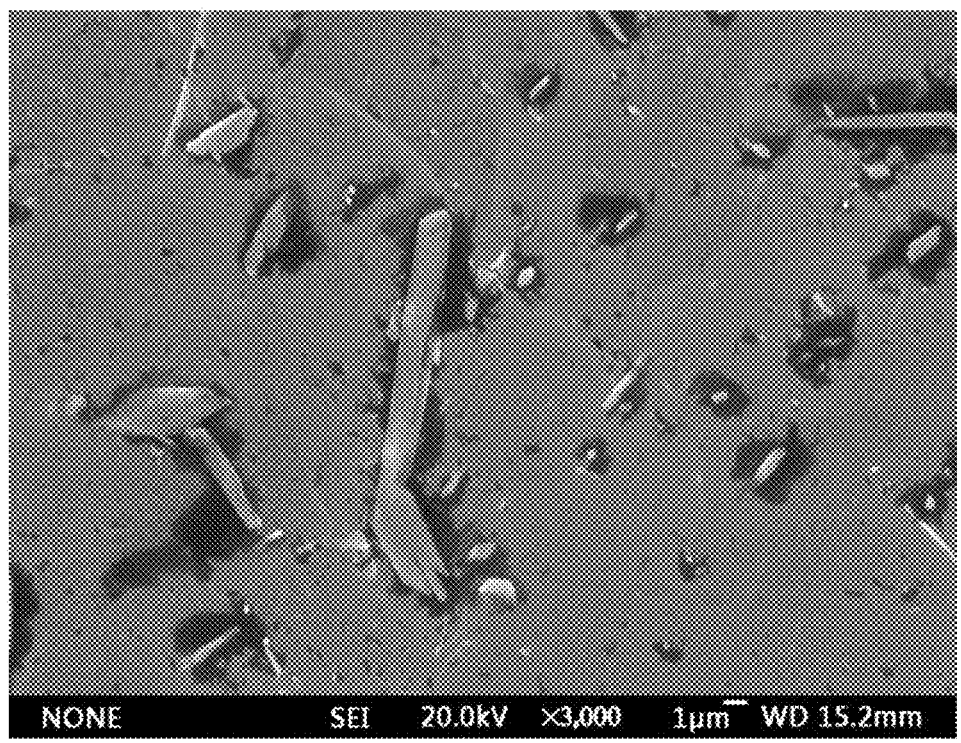
FIG. 8 is a scanning electron micrograph showing the morphology of the boron-containing titanium-based composite powder after heat-treated at 1000° C.

FIG. 8 shows the morphology of the boron-containing titanium-based composite powder after heat-treated at 1000° C., where the TiBw crystal whiskers grow to a particle size of 5 μm or more.

EXAMPLE 1

Provided herein was a method of preparing a TiBw/Ti composite powder for 3D printing, which was specifically described as follows.

(1) Preparation of Powder Mixture 0.5% by weight of titanium diboride and 99.5% by weight of titanium sponge were respectively prepared and then mixed uniformly to produce a powder mixture, where the element B was derived from $TiB_2$, and compositions of the titanium diboride and the titanium sponge were shown in Table 1.

(2) Preparation of Consumable Electrode

The powder mixture was pressed into a consumable electrode with a size of 300×60×60 mm by a 630-ton hydraulic press.

(3) Melting

The consumable electrode was subjected to vacuum melting twice to obtain a composite ingot with a diameter of 170 mm, where the element B was derived from the titanium diboride, and the element Ti was derived from the titanium sponge.

(4) Preparation of a Titanium-Based Composite Bar

The composite ingot was polished, heated to 1000-1050° C. in a high-temperature furnace and kept at 1000-1050° C. for 2 h. Then the composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine into a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

The boron-containing titanium-based composite powder obtained above was subjected to heat treatment at 1000° C. under an argon atmosphere using a Sparking Plasma Sintering (SPS) device and kept at 1000° C. for 15 min.

EXAMPLE 2

Provided herein was a method of preparing a TiB/Ti composite powder for 3D printing, which was specifically described as follows.

(1) Preparation of Powder Mixture

1% by weight of titanium diboride and 99% by weight of titanium sponge were respectively prepared and then mixed uniformly to produce a powder mixture, where the element B was derived from $TiB_2$, and compositions of the titanium diboride and the titanium sponge were shown in Table 1.

(2) Preparation of Consumable Electrode

The powder mixture was pressed into a consumable electrode with a size of 300×60×60 mm by a 630-ton hydraulic press.

(3) Melting

The consumable electrode was subjected to vacuum melting twice to obtain a composite ingot with a diameter of 170 mm, where the element B was derived from the titanium diboride, and the element Ti was derived from the titanium sponge.

(4) Preparation of a Titanium-Based Composite Bar

The composite ingot was polished, heated to 1000-1050° C. in a high-temperature furnace and kept at 1000-1050° C. for 2 h. Then the composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine into a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

The boron-containing titanium-based composite powder obtained above was subjected to heat treatment at 850° C. under an argon atmosphere using a Sparking Plasma Sintering (SPS) device and kept at 850° C. for 15 min.

EXAMPLE 3

A TiB/Ti composite powder for 3D printing was prepared through the following steps.

(1) 2% by weight of titanium diboride and 98% by weight of titanium sponge were respectively prepared and then mixed uniformly to produce a powder mixture, where the element B was derived from $TiB_2$, and compositions of the titanium diboride and the titanium sponge were shown in Table 1.

(2) Preparation of Consumable Electrode

The powder mixture was pressed into a consumable electrode with a size of 300×60×60 mm by a 630-ton hydraulic press.

(3) Melting

The consumable electrode was subjected to vacuum melting twice to obtain a composite ingot with a diameter of 170 mm, where the element B was derived from the titanium diboride, and the element Ti was derived from the titanium sponge.

(4) Preparation of a Titanium-Based Composite Bar

The composite ingot was polished, heated to 1000-1050° C. in a high-temperature furnace and kept at 1000-1050° C. for 2 h. Then the composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine into a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

The boron-containing titanium-based composite powder obtained above was subjected to heat treatment at 750° C. under an argon atmosphere using a Sparking Plasma Sintering (SPS) device and kept at 750° C. for 15 min.

EXAMPLE 4

A TiB/Ti composite powder for 3D printing was prepared through the following steps.

(1) 2% by weight of titanium diboride and 98% by weight of titanium sponge were respectively prepared and then mixed uniformly to produce a powder mixture, where the element B was derived from $TiB_2$, and compositions of the titanium diboride and the titanium sponge were shown in Table 1.

(2) Preparation of Consumable Electrode

The powder mixture was pressed into a consumable electrode with a size of 300×60×60 mm by a 630-ton hydraulic press.

(3) Melting

The consumable electrode was subjected to vacuum melting twice to obtain a composite ingot with a diameter of 170 mm, where the element B was derived from the titanium diboride, and the element Ti was derived from the titanium sponge.

(4) Preparation of a Titanium-Based Composite Bar

The composite ingot was polished, heated to 1000-1050° C. in a high-temperature furnace and kept at 1000-1050° C. for 2 h. Then the composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine into a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

The boron-containing titanium-based composite powder obtained above was subjected to heat treatment at 850° C. under an argon atmosphere using a Sparking Plasma Sintering (SPS) device and kept at 850° C. for 15 min.

EXAMPLE 5

A TiB/Ti composite powder for 3D printing was prepared through the following steps.

(1) 2% by weight of titanium diboride and 98% by weight of titanium sponge were respectively prepared and then mixed uniformly to produce a powder mixture, where the element B was derived from $TiB_2$, and compositions of the titanium diboride and the titanium sponge were shown in Table 1.

(2) Preparation of Consumable Electrode

The powder mixture was pressed into a consumable electrode with a size of 300×60×60 mm by a 630-ton hydraulic press.

(3) Melting

The consumable electrode was subjected to vacuum melting twice to obtain a composite ingot with a diameter of 170 mm, where the element B was derived from the titanium diboride, and the element Ti was derived from the titanium sponge.

(4) Preparation of a Titanium-Based Composite Bar

The composite ingot was polished, heated to 1000-1050° C. in a high-temperature furnace and kept at 1000-1050° C. for 2 h. Then the composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine into a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

The boron-containing titanium-based composite powder obtained above was subjected to heat treatment at 950° C. under an argon atmosphere using a Sparking Plasma Sintering (SPS) device and kept at 950° C. for 15 min.

EXAMPLE 6

A TiB/Ti composite powder for 3D printing was prepared through the following steps.

(1) 2% by weight of titanium diboride and 98% by weight of titanium sponge were respectively prepared and then mixed uniformly to produce a powder mixture, where the element B was derived from $TiB_2$, and compositions of the titanium diboride and the titanium sponge were shown in Table 1.

(2) Preparation of Consumable Electrode

The powder mixture was pressed into a consumable electrode with a size of 300×60×60 mm by a 630-ton hydraulic press.

(3) Melting

The consumable electrode was subjected to vacuum melting twice to obtain a composite ingot with a diameter of 170 mm, where the element B was derived from the titanium diboride, and the element Ti was derived from the titanium sponge.

(4) Preparation of a Titanium-Based Composite Bar

The composite ingot was polished, heated to 1000-1050° C. in a high-temperature furnace and kept at 1000-1050° C. for 2 h. Then the composite ingot was subjected to billet forging using a 1-ton air hammer to obtain a bar A with a diameter of 100 mm. The bar A was polished and heated to 950° C. in the high-temperature furnace and kept at 950° C. for 2 h. The bar A was forged using a SKK-14 radial forging machine into a bar B with a diameter of 45 mm, and then the bar B was mechanically processed to produce a composite titanium-based bar C with a size of 41 mm×400 mm and a conical front end.

(5) The composite titanium-based bar C was subjected to electrode induction melting ultrasonic gas atomization to prepare the boron-containing titanium-based composite powder.

The boron-containing titanium-based composite powder obtained above was subjected to heat treatment at 1000° C. under an argon atmosphere using a Sparking Plasma Sintering (SPS) device and kept at 1000° C. for 15 min.

What is claimed is:

1. A boron-containing titanium-based composite powder for 3D printing, consisting of 0.5%-2% by weight of titanium diboride and 98%-99.5% by weight of titanium sponge;
wherein the boron-containing titanium-based composite powder has an internal nano quasi-continuous network structure formed by titanium monoboride whisker (TiBw) and titanium (Ti) crystal grains; the quasi-continuous network structure has a size of 2-3 μm, and TiBw has a particle size of 8-15 nm;
the boron-containing titanium-based composite powder is prepared by a method comprising the following steps:
(1) mixing 0.5%-2% by weight of the titanium diboride with 98%-99.5% of the titanium sponge to produce a powder mixture;
(2) pressing the powder mixture by a hydraulic press into a consumable electrode with a size of 300×60×60 mm;
(3) performing vacuum melting twice on the consumable electrode to obtain a composite ingot with a diameter of 170 mm;
(4) polishing the composite ingot; heating the polished ingot to a first temperature in a high-temperature furnace; keeping the polished ingot at the first temperature; subjecting the heated composite ingot to billet forging using a 1-ton air hammer to obtain a bar A; polishing the bar A and heating the polished bar A to a second temperature in the high-temperature furnace; keeping the polished bar A at the second temperature; forging the heated bar A using a radial forging machine to obtain a bar B; mechanically processing the bar B to produce a composite titanium-based bar C with a size of 41 mm×400 mm; and
(5) subjecting the composite titanium-based bar C to electrode induction melting ultrasonic gas atomization to prepare the boron-containing titanium-based composite powder.

2. The boron-containing titanium-based composite powder of claim 1, wherein the hydraulic press in step (2) is a 630-ton hydraulic press.

3. The boron-containing titanium-based composite powder of claim 1, wherein in step (4), a diameter of the bar A is 100 mm; a diameter of the bar B is 45 mm; and the bar C has a conical front end.

4. The boron-containing titanium-based composite powder of claim 1, wherein in step (4), the first temperature is 1000-1050° C. and the polished ingot is kept at 1000-1050° C. for 2 h; the second temperature is 950° C. and the polished bar A is kept at 950° C. for 2 h; and the radial forging machine is a SKK-14 forging machine.

5. The boron-containing titanium-based composite powder of claim 1, wherein the boron-containing titanium-based composite powder obtained in step (5) is subjected to heat treatment by a Sparking Plasma Sintering device.

6. The boron-containing titanium-based composite powder of claim 5, wherein the heat treatment is performed at 750-1000° C., and then the boron-containing titanium-based composite powder is kept at 750-1000° C. for 15 min.

* * * * *